United States Patent [19]

Regan

[11] Patent Number: 4,589,689
[45] Date of Patent: May 20, 1986

[54] ENERGIZED SEAL FOR UPPER TERMINATION

[75] Inventor: A. Michael Regan, Huntington Beach, Calif.

[73] Assignee: Hughes Tool Company, Houston, Tex.

[21] Appl. No.: 600,662

[22] Filed: Apr. 16, 1984

[51] Int. Cl.$^4$ .................. F16L 35/00; F16L 17/00
[52] U.S. Cl. ..................................... 285/24; 285/101; 285/108; 285/917
[58] Field of Search ................... 285/24, 96, 101, 108, 285/111, DIG. 19, DIG. 18

[56] References Cited

U.S. PATENT DOCUMENTS

| | | | |
|---|---|---|---|
| 3,058,750 | 10/1962 | Taylor | 285/DIG. 18 |
| 3,195,930 | 7/1965 | Ascherl et al. | 285/101 |
| 3,207,524 | 9/1965 | Trbovich | 285/DIG. 18 |
| 3,291,442 | 12/1966 | Cranage | 285/101 |
| 3,701,549 | 10/1972 | Koomey et al. | 285/24 |
| 3,841,670 | 10/1974 | Bottoms | 285/101 |
| 4,396,212 | 8/1983 | Honke | 285/108 |
| 4,403,658 | 9/1983 | Watkins | 166/355 |
| 4,411,434 | 10/1983 | Lewis | 285/96 |
| 4,476,934 | 10/1984 | Regan | 166/368 |

FOREIGN PATENT DOCUMENTS

| | | | |
|---|---|---|---|
| WO82/02240 | 7/1982 | PCT Int'l Appl. | 285/101 |
| 1265938 | 3/1972 | United Kingdom | 285/24 |
| 0804985 | 2/1981 | U.S.S.R. | 285/96 |

*Primary Examiner*—Richard J. Scanlan, Jr.
*Assistant Examiner*—Anthony Knight
*Attorney, Agent, or Firm*—James E. Bradley

[57] ABSTRACT

A seal assembly has features to seal the junction of two passages. The assembly includes a piston with a seal on its face. The piston has a passage extending through it. Hydraulic fluid applied to an annular cavity moves the piston forwardly and rearwardly independent of fluid pressure in the passage. Once sealed, pressure in the passage acts on the end of the piston to maintain sealing engagement.

4 Claims, 3 Drawing Figures

ENERGIZED SEAL FOR UPPER TERMINATION

BACKGROUND OF THE INVENTION

1. Field of the Invention

This invention relates in general to equipment for drilling and producing subsea wells, and in particular to a seal assembly located at the top of a riser string extending between the subsea well and a floating drilling or production platform.

2. Description of the Prior Art

In U.S. Pat. No. 4,403,658, Sept. 13, 1983, Watkins, a single stab union is shown for an offshore drilling or production platform. In the patent, at the top of the riser run or string, a termination head is adapted to be received within a female termination housing. The termination housing has a number of radial ports that register with passages located in the termination head. These ports contain high pressure fluid for transmission between the vessel and the subsea well. If it is necessary to disconnect the lower end of the riser from the subsea well temporarily, the termination head can be pulled upward from the termination housing. The lines or hoses connected to the termination housing can remain in place, connected to the housing.

Seals are required to seal the junction of the termination housing radial ports with the termination head radial passages. In the patent, static elastomeric seals are shown encircling each outlet of the termination head ports.

SUMMARY OF THE INVENTION

In this invention, a movable seal is provided for sealing the radial passages between the termination head and termination housing. The seal assembly includes an annular piston carried in one of the termination members and having a passage through it for transmitting fluid. An annular seal is mounted on the face of the piston surrounding the piston passage for sealing contact with the other termination member. The piston is movable between a retracted position in which the seal is recessed within the passage to an expanded position in sealing engagement with the other member. The piston has an end opposite its face that is exposed to fluid pressure contained within the radial passage. This fluid pressure applies a force to the end of the piston, which is dimensioned to result in a net force toward the other termination member after sealing engagement. The piston is moved by hydraulic pressure supplied through passages that are isolated from the fluid in the radial passages.

DESCRIPTION OF THE PREFERRED EMBODIMENT

Figure 1:
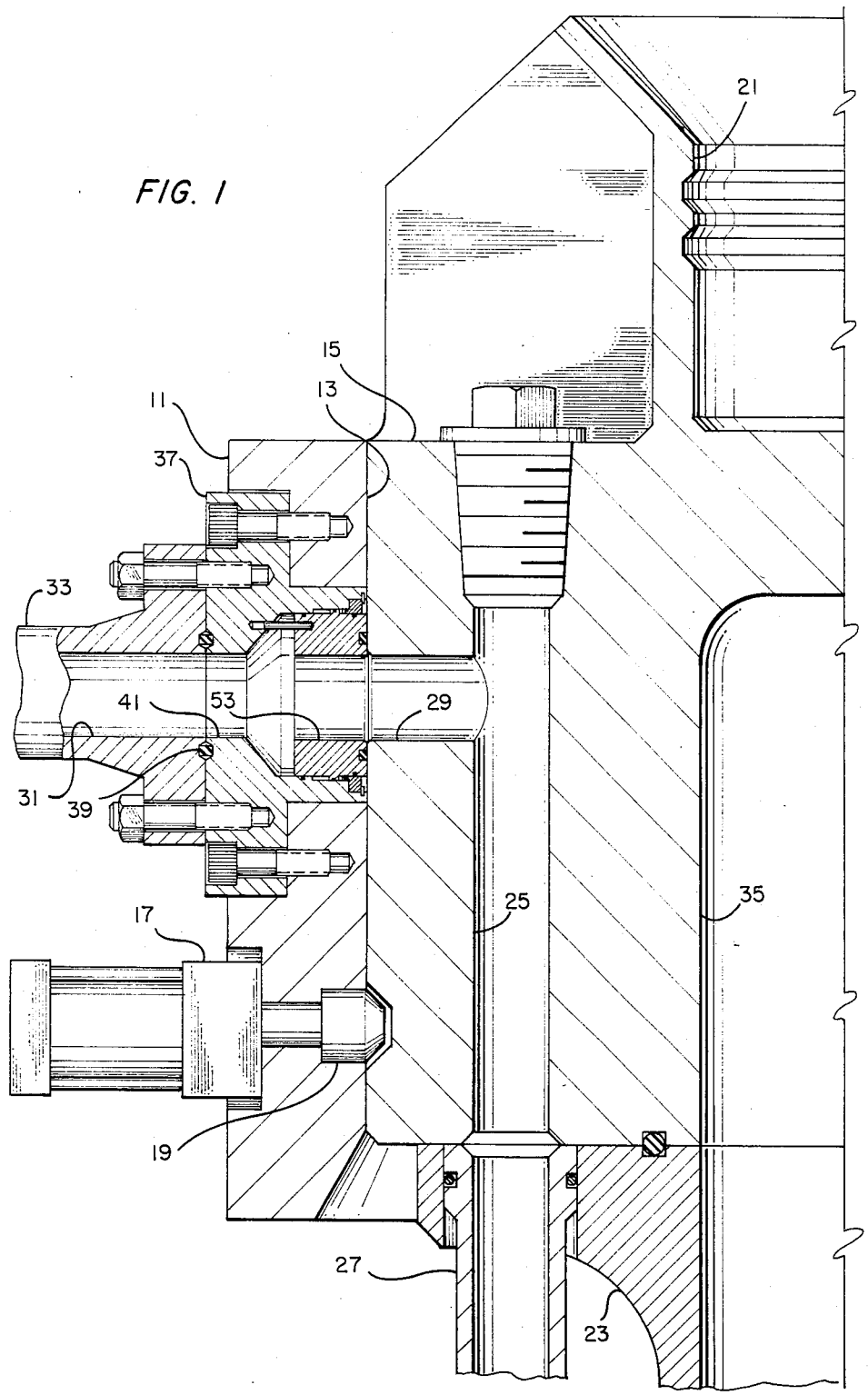
FIG. 1 is a sectional view of part of a termination head and termination housing for an offshore drilling or production vessel.

Referring to FIG. 1, termination housing 11 is a generally cylindrical member having a cylindrical cavity 13. Termination housing 11 is adapted to be supported by a vessel (not shown) in the same manner as shown in U.S. Pat. No. 4,403,658. A termination head 15 slides within and is supported by the termination housing 11. A locking cylinder 17 mounted to the termination housing 11 engages a groove 19 formed in the termination head 15 to retain the termination head 15. Termination head 15 has a grooved bore 21 on its upper end that is adapted to receive a handling tool (not shown) for lifting the termination head 15 upward with respect to the termination housing 11. A termination riser adapter joint 23 is secured to the lower end of the termination head 15. A riser string (not shown) extends downward from the termination riser adapter joint 23 to a subsea wellhead (not shown). Lifting the termination head 15 lifts the entire riser string.

The termination head 15 has a number of vertical passages 25 (only one shown) that are offset from the axis of the termination head and spaced around the axis. Each vertical passage 25 connects to a flowline 27 that extends downwardly through the riser string. Each vertical passage 25 joins a radial passage 29 that extends radially outward to the cylindrical exterior of the termination head 15. A plurality of radial passages or ports 31 (only one shown) extend through the termination housing 11 for aligning with each radial passage 29 in the termination head 15. The radial port 31 is contained within a coupling 33 that connects to flexible hoses (not shown) that extend to the vessel for supplying fluid through the passages 31, 29, 25 and flowlines 27. Termination head 15 also has an axial passage 35 for transmitting fluids to and from the subsea wellhead through the riser string. Axial passage 35 also has a radial passage (not shown) that registers with a port (not shown) in termination housing 11 in the same manner as port 31.

Coupling 33, which contains port 31, is bolted to a housing 37, which in turn is bolted to the sidewall of the termination housing 11. Housing 37 is a cylindrical member, having two different diameters and received within a bore in the termination housing 11. An annular seal 39 is located between the coupling 33 and the housing 37.

Figure 2:
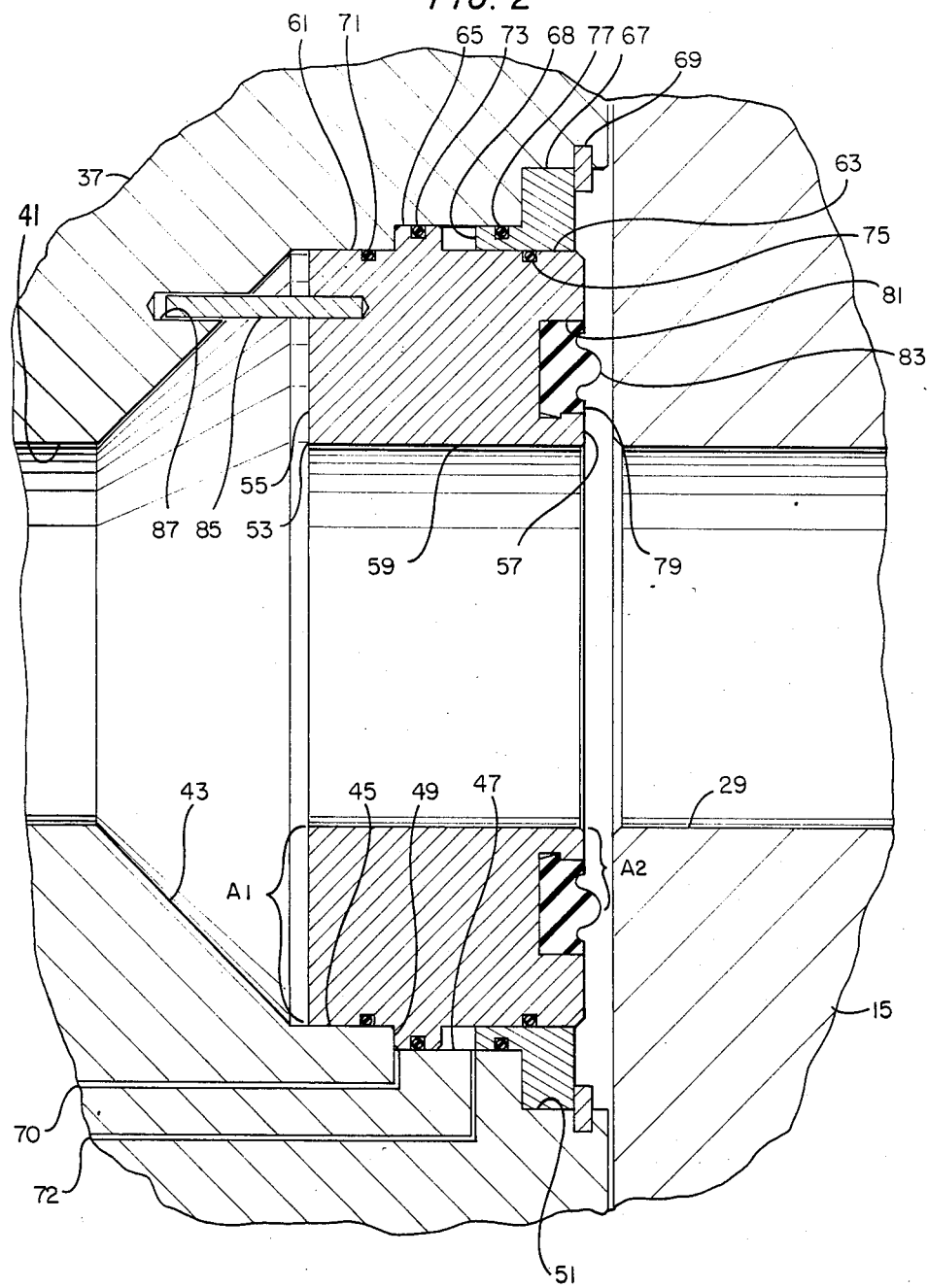
FIG. 2 is an enlarged view of a portion of the seal assembly shown in the termination housing of FIG. 1.

Referring to FIG. 2, housing 37 has a passage or bore 41 that is co-axial with the coupling passage 31 (FIG. 1) and radial passage 29 in the termination head 15. Passage 41 has a frusto-conical section 43 that flares in a forward direction, facing inwardly toward termination head 15. The rusto-conical section 43 joins a cylindrical section 45. Cylindrical section 45 joins a cylindrical section 47 of greater diameter, which defines a forwardly facing shoulder 49 that is perpendicular to the axis of passage 41. The cylindrical section 47 joins an even larger diameter counterbore section 51 which terminates at the inner diameter of housing 37. The inner diameter of housing 37 is flush with the cylindrical cavity 13 (FIG. 1) of termination housing 11.

A metal piston 53 is reciprocally carried in the housing 37. Piston 53 has a rearward end 55 that is located in a plane perpendicular to the axis of bore 41. Piston 53 has a forward end or face 57 that is also located in a plane perpendicular to the axis of bore 41. The forward end 57 may be slightly concave to mate with the curvature of the termination head 15 if desired. Piston 53 is annular, having a bore 59 which is co-axial with the axis of bore 41 and extends completely through piston 53 from the rearward end 55 to the forward end 57.

Piston 53 has a rearward sidewall section 61 that is cylindrical and closely and slidingly received within the bore section 45. Piston 53 also has a forward sidewall section 63 which is cylindrical and is of the same diameter as the rearward sidewall section 61. Sidewall sections 61 and 63 are separated by an annular shoulder or flange 65 located between the ends 55 and 57. Flange 65 is rectangular in cross-section and has a cylindrical sidewall closely and slidingly received in the passage section 47.

A retainer 67 is located on the forward end of the housing 37 for retaining the piston 53. Retainer 67 is an annular element having a portion carried within the counterbore section 51 and another portion carried within the passage section 47. Retainer 67 has a rearwardly facing wall 68 that faces the bore shoulder 49. Retainer 67 is secured in place by a snap or retaining ring 69. Retainer 67 has a cylindrical interior that closely and slidingly receives the piston forward sidewall section 63.

Retainer wall 68 and the shoulder 49 define between them a recess or cavity of greater diameter than the passage cylindrical section 45 for receiving the flange 65. The distance between the retainer wall 68 and the shoulder 49 is greater than the axial or longitudinal dimension of the flange 65 to enable stroking of piston 53. Piston 53, cylindrical wall 47, shoulder 49 and retainer wall 68 define a closed cavity, which is separated into two chambers isolated from each other by the flange 65. A hydraulic fluid passage 70 leads to the cavity space between the shoulder 49 and the flange 65, this space serving as an extend chamber for causiang the piston 53 to move forwardly when hydraulic fluid pressure is applied to passage 70. A passage 72 leads to the cylindrical wall section 47 just rearwardly of the retainer wall 68 for supplying hydraulic fluid to the space between wall 68 and flange 65. This space serves as a retract chamber for moving piston 53 rearwardly when hydraulic fluid is applied to passage 72 and exhausted from passage 70.

Piston 53 has an O-ring 71 for sealing its rearward sidewall section 61, an O-ring 73 for sealing flange 65 and an O-ring 75 for sealing the forward sidewall section 63. An O-ring 77 seals the retainer 67 to the housing wall 47. The elastomeric O-rings 71, 73, 75 and 77 serve as seal means for sealing hydraulic fluid pressure in the cavity that receives flange 65 from fluid that is located in the passage 41. An annular seal ring 79 is contained in a groove 81 formed in the face of forward end 57 of piston 53. Seal 79 is an elastomeric seal having a protruding lip 83 in a central section of the seal ring. When piston 53 is located in a sealing position, lip 83 deforms to provide sealing of the fluid contained in passages 41, 59 and 29. A guide pin 85 is secured to piston 53 and extends into a hole 87 provided in the frusto-conical section 43 for maintaining alignment of the piston 53 as it moves between its retracted position as shown in FIG. 2 and its extended position as shown in FIG. 1.

In operation of the embodiment of FIG. 1 and FIG. 2, the termination housing 11 will be supported from the floating vessel (not shown) as described in U.S. Pat. No. 4,403,658. The piston 53 will be in the retracted position shown in FIG. 2 prior to lowering of the termination head 15 into the termination housing 11. Once lowered into place, the passages 29 in the termination head 15 will align with the passage 59 in each piston 53. The locking cylinder 17 will retain the termination head 15 with the termination housing 11.

Hydraulic fluid pressure is then applied through passage 70 to act against the flange 65 to cause the piston to move forwardly and seal against the termination head 15. Then, fluid may be pumped through the passages 31, 41, 29, 25 and flowline 27 for various used at the subsea well. This fluid may be hydraulic fluid, also. However, the hydraulic fluid pressure in passages 70 and 72 is isolated from the fluid and pressure in passages 31, 41, 59 and 29. When piston 53 is in sealing engagement with termination head 15, the fluid pressure in passage 41 acts on the rearward end 55 of piston 53. This pressure also acts on the portion of the forward end 57 of piston 53 that is located inward of the lip 83 of the seal. The pressure area $A_1$ on the rearward end 55 is greater than the area pressure $A_2$, which extends from passage 59 to lip 83. The difference in areas results in a net forwardly acting force tending to maintain the piston 53 in engagement with the termination head 15, regardless of the hydraulic fluid pressure at passage 70.

When the termination head 15 is to be pulled upwardly from the termination housing 11, fluid pressure is removed from passages 31, 41, 59 and 29. Then, hydraulic fluid pressure is applied to hydraulic fluid passage 72 to push the piston 53 rearwardly with hydraulic fluid returning through passage 70. This retracts piston 53 such that the lip 83 does not protrude past the housing cavity 13. The termination head 15 is then pulled upwardly.

Figure 3:
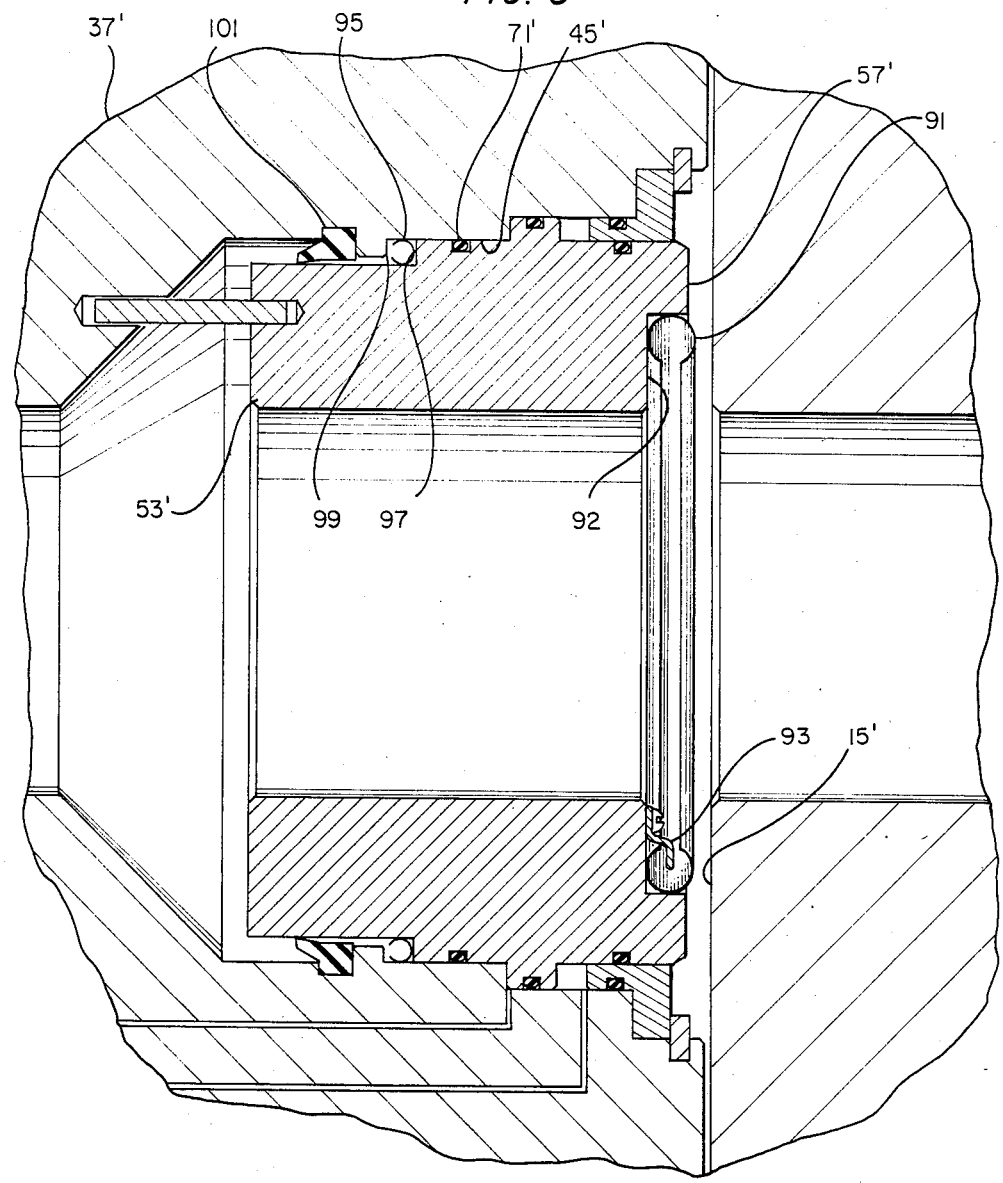
FIG. 3 is an alternate embodiment of a seal assembly for the termination housing of FIG. 1.

FIG. 3 shows an alternate embodiment. In this embodiment, the components that are similar to the components shown in FIG. 2 are either labeled with a prime symbol or not labelled at all. A metal C-seal 91 is used instead of the elastomeric seal 79 of FIG. 2. Seal 91 has a C-shaped cross-section. Seal 91 is mounted in an annular recess 92 in the forward end 57' of piston 53'. Seal 91 is retained by one or more clips 93 in a conventional manner. Seal 91 protrudes slightly past the forward end 57' of piston 53' and compresses when in contact with the termination head 15'.

Also, in addition to the elastomeric O-ring 71', this embodiment has a metal C-ring 95 located rearwardly of O-ring 71'. Ring 95 provides sealing by being compressed between the passage cylindrical section 45' and piston 53'. Ring 95 is carried between a shoulder 97 formed on piston 53' and a shoulder 99 formed in the bore of housing 37'. An elastomeric wiper 101 is located rearwardly of the shoulder 99. The emboidment in FIG. 3 operates in the same manner as previously described in connection with the embodiment of FIGS. 1 and 2.

The invention has significant advantages. The piston actuated seal assembly allow the seal to be retracted to protect the seal while the termination head is being lowered into the termination housing. The piston also utilizes internal pressure to maintain the seal in engagement, apart from any hydraulic fluid pressure used to reciprocate the piston from one position to the other. The positive force exerted on the piston makes it easier to provide seats for the seal in that they are not so sensitive to tolerances as would be a static seal. The metal seal are, not be subject to temperature degradation, and would not extrude as might an elastomeric seal under high pressure.

While the invention has been shown in only two of its forms, it should be apparent to those skilled in the art that it is not so limited but is subject to various changes without departing from the scope of the invention.

I claim:

1. In a fluid connection system for a subsea well having a termination head connected to a riser string, a termination housing having a receptacle which releasably receives the termination head, the termination head and termination housing having passages traverse to the axis of the riser string that register with each other for communicating fluids between the floating vessel and riser string, the improvement comprising in combination:

hose means rigidly mounted to the housing for communicating fluids in the passage of the housing with the floating vessel;

an annular piston reciprocally carried in the passage of the housing and having a bore therethrough for transmitting fluid, the piston having forward and rearward ends;

annular seal means for sealing the piston with the head when the piston is moved forwardly into contact with the head; and fluid pressure means for moving the piston relative to the hose means and housing forwardly into sealing engagement with the head and rearwardly to allow the head to be moved from the housing;

the rearward end of the piston being located within the housing passage and spaced forwardly of the hose means, the rearward end of the piston having a pressure area in communication with pressure of the fluid in the passage, the forward end of the piston having a pressure area located inwardly of the seal means that is in communication with the pressure of the fluid in the passage when the piston is in sealing engagement, the pressure area of the rearward end being greater than the pressure area of the forward end to provide a net forward force on the piston.

2. In a fluid connection system for a subsea well having a termination head connected to a riser string, a termination housing having a receptacle which releasably receives the termination head, the termination head and termination housing having passages transverse to the axis of the riser string that register with each other for communicating fluids between the floating vessel and riser string, the improvement comprising in combination:

hose means ridigly mounted to the housing for communicating fluids in the passage of the housing with the floating vessel;

a piston with forward and rearward ends, a cylindrical sidewall, an annular external flange located between the ends, the flange having forward and rearward facing end walls, the piston having an axial bore extending therethrough between the ends;

the piston being reciprocally carried in the housing passage with its sidewall in sliding sealing contact with the passage, the passage having an annular cavity that sealingly receives the flange, that is of larger diameter than the portions of the passage receiving the piston sidewall, has a greater length than the longitudinal length of the flange, and terminates at each end with shoulder facing each other, the shoulders and end walls cooperating to define extend and retract chambers within the cavity separated by the flange;

seal means between the sidewall of the piston on each side of the flange and the passage for sealing fluid in the passage from fluid in the cavity;

hydraulic fluid pressure means for selectively supplying hydraulic fluid to the chambers of the cavity to move the piston forwardly and rearwardly relative to the hose means and housing; and annular seal means mounted to the piston for sealing against the head when the piston is extended;

the rearward end of the piston being located within the housing passage and spaced forwardly of the hose means, the rearward end of the piston having a pressure area in communication with pressure of the fluid in the passage, the forward end of the piston having a pressure area located inwardly of the seal means that is in communication with the pressure of the fluid in the passage when the piston is in sealing engagement, the pressure area of the rearward end being greater than the pressure area of the forward end, to provide a net forward force on the piston.

3. In a riser string of conduit extending from a subsea well to a floating vessel, having a connection assembly in the string that includes a housing having a longitudinal cavity with at least one radially directed passage extending through the housing into the cavity, and a termination head connected to the string and adapted to be received within the cavity of the housing, the head having at least one passage that mates with the passage in the housing for communicating fluids between the floating vessel and the string, the improvement comprising in combination:

a coupling member rigidly mounted to the housing within the housing passage and having a bore coaxial with the housing passage;

hose means rigidly mounted to the coupling member for communicating fluids in the bore of the coupling member with the floating vessel;

an annular piston having forward and rearward ends and reciprocally carried in the bore of the coupling member, the piston having a bore therethrough for transmitting fluid;

an annular seal on the forward end of the piston and surrounding the piston bore for sealing against the head; and hydraulic fluid pressure means for selectively moving the piston forwardly relative to the coupling member and the hose means into sealing engagement with the head to communicate fluid between the floating vessel and the passage in the head, and rearwardly to retract the forward end of the piston into the passage in the housing for allowing the head to be removed from the housing;

the rearward end of the piston being located within the bore of the coupling member and spaced forward from the hose means for being acted on by pressure in the hose means and coupling member, defining a pressure area in communication with pressure of the fluid in the hose means, the forward end of the piston having a pressure area located inward of the seal that is in communication with the pressure of the fluid in the piston bore when the piston is in sealing engagement, the pressure area of the rearward end being greater than the pressure area of the forward end to provide a net forward force acting on the piston.

4. In a fluid connection system for a subsea well having a termination head connected to a riser string, a termination housing having a receptacle which releasably receives the termination head, the termination head and termination housing having passages transverse to the axis of the riser string that register with each other for communicating fluids between the floating vessel and riser string, the improvement comprising in combination:

hose means rigidly mounted to the housing for communicating fluids in the passage of the housing with the floating vessel;

a piston with forward and rearward ends, a cylindrical sidewall, an annular flange located between the ends, the flange having forward and rearward facing end walls, the piston having an axial bore extending therethrough between the ends;

the piston being reciprocally carried in the housing passage with its sidewall in sliding sealing contact with the passage, the passage having an annular cavity that sealingly receives the flange and is of larger diameter than the portions of the passage receiving the piston sidewall, has a greater length than the axial length of the flange, and terminates at each end with shoulders facing each other, the shoulders and end walls cooperating to define extend and retract chambers within the cavity separated by the flange;

seal means between the sidewall of the piston on each side of the flange and the passage for sealing fluid in the passage from pressure in the cavity, the seal means including at least one metal C-ring;

hydraulic fluid pressure means for selectively supplying hydraulic fluid to the chambers of the cavity to move the piston forwardly and rearwardly relative to the hose means and housing; and an annular metal C-ring mounted in the forward end of the piston and surrounding the piston bore for sealing against the other member when the piston is extended;

the rearward end of the piston being located within the housing passage and spaced forwardly of the hose means, the rearward end of the piston having a pressure area in communication with pressure of the fluid in the passage, the forward end of the piston having a pressure area located inwardly of the seal that is in communication with the pressure of the fluid in the passage when the piston is in sealing engagement, the pressure area of the rearward end being greater than the pressure area of the forward end to provide a net forward force on the piston.

* * * * *